US011458447B2

(12) United States Patent
Isom et al.

(10) Patent No.: US 11,458,447 B2
(45) Date of Patent: Oct. 4, 2022

(54) APPARATUS FOR FACILITATING PHOTOCHEMICAL REACTIONS

(71) Applicant: Analytical Sales & Services, Inc., Flanders, NJ (US)

(72) Inventors: David C. Isom, Stockholm, NJ (US); Matthew Dabrowski, Newton, NJ (US)

(73) Assignee: Analytical Sales and Services, Inc., Flanders, NJ (US)

(*) Notice: Subject to any disclaimer, the term of this patent is extended or adjusted under 35 U.S.C. 154(b) by 500 days.

(21) Appl. No.: 16/518,560

(22) Filed: Jul. 22, 2019

(65) Prior Publication Data
US 2021/0023525 A1 Jan. 28, 2021

(51) Int. Cl.
*B01J 19/12* (2006.01)
*G02B 3/00* (2006.01)

(52) U.S. Cl.
CPC .......... *B01J 19/123* (2013.01); *G02B 3/0006* (2013.01); *B01J 2219/1203* (2013.01)

(58) Field of Classification Search
CPC ............ B01J 19/123; B01J 2219/1203; G02B 3/0006; G02B 3/06; G02B 3/02; G02B 3/04; G02B 3/10; G02B 3/0062; G02B 1/002; G02B 1/06; G02B 1/08; G02B 2203/0093; G02B 13/0015; G02B 13/0005; G02B 7/02; G02B 13/18; G02B 27/12; G02B 27/14; G02B 27/144; G02B 5/0883; G02B 5/0891; G02B 5/128
See application file for complete search history.

(56) References Cited

U.S. PATENT DOCUMENTS

| 9,480,766 | B2 | 11/2016 | Van Buskirk et al. | |
|---|---|---|---|---|
| 10,263,149 | B2 | 4/2019 | Samuelson et al. | |
| 2010/0226130 | A1* | 9/2010 | Cheng | B29D 11/00807 264/1.7 |
| 2019/0270065 | A1* | 9/2019 | Bazin | B01J 19/0013 |
| 2020/0406224 | A1* | 12/2020 | Thompson | C01B 32/05 |

OTHER PUBLICATIONS

Chi Le, A General Small-Scale Reactor To Enable Standardization and Acceleration of Photocatalytic Reactions, ACS Cent. Sci. 2017, 3, 647-653.

* cited by examiner

*Primary Examiner* — Xiuyu Tai
(74) *Attorney, Agent, or Firm* — Lawrence B. Goodwin; Mandelbaum Barrett PC (57) ABSTRACT

Apparatus for facilitating a chemical reaction through the application of light, including a light source providing illumination at a selected wavelength, a lens material adapted to be in physical contact with the light source, when in use, and a receptacle for holding a reaction vial in which the chemical reaction takes place, the receptacle adapted to position a portion of the reaction vial in physical contact with the lens material when in use, wherein the lens material has a refractive index that facilitates the transmission of the illumination from the light source to the reaction vial. Alternatively, the receptacle and vial may be replaced by a reaction plate in which reaction wells are formed.

43 Claims, 6 Drawing Sheets

APPARATUS FOR FACILITATING PHOTOCHEMICAL REACTIONS

FIELD OF THE INVENTION

The present invention relates to the field of photochemical reactions, such as photoredox catalysis, and specifically apparatus for facilitating such reactions.

BACKGROUND

Many chemical reactions are facilitated through the application of light. For example, photoredox catalysis is a branch of catalysis that harnesses the energy of light to accelerate a chemical reaction via single-electron transfer events. The term "photoredox" is based on a combination of "photo" referring to light, and "redox," a condensed expression for the chemical processes of reduction and oxidation. In particular, photoredox catalysis employs small quantities of a light-sensitive compound that, when excited by light, can mediate the transfer of electrons between chemical compounds that would usually not react at all.

Photoredox catalysis has become prominent in organic chemistry as a powerful tool for the activation of small molecules. It relies on the ability of metal complexes and organic dyes to convert visible light into chemical energy by engaging in single-electron transfer with organic substrates, thereby generating reactive intermediates.

Although significant effort has been expended on the specific chemistry of photoredox catalysis, there has also been significant interest in decreasing reaction times. For example, photon flux decreases exponentially with increasing path length and concentration. Thus, incomplete irradiation of reaction solutions may cause the photoexcited catalyst to exist only at the reactor surface, which can lead to both long reaction times and poor reaction efficiencies for larger reaction volumes.

In theory, increasing light intensity can lead to an increase in photon capture by the photocatalyst, affording a higher concentration of the excited-state species and reduced reaction times. Various light sources, for example, light-emitting diode (LED) arrays of specific wavelengths and varying intensities have been proposed for this purpose. However, merely increasing the intensity of the light source can often result in decreased yields resulting from unproductive thermal pathways, and thus, a reduction in reaction times has been difficult to achieve.

SUMMARY OF THE INVENTION

It is therefore an object of the present invention to provide an apparatus for facilitating photochemical reactions that significantly reduces reaction times.

In accordance with a first aspect of the invention, apparatus for facilitating chemical reactions through the application of light comprises (i) a rack adapted to hold an array of vials in which the chemical reactions are to take place, the rack having openings on the bottom thereof at locations corresponding to the locations of the array of vials, to thereby expose a portion of the bottoms of the vials when in use, (ii) an array of surface mounted LEDs having locations corresponding to the locations of the array of vials, and (iii) an array of lenses adapted to be disposed between the array of vials and the array of surface mounted LEDs, such that each of the lenses is adapted to be positioned directly below an associated one of the vials and positioned directly above an associated one of the surface mounted LEDs. The rack, the array of surface mounted LEDs and the array of lenses are configured such that, when in use, each of the lenses is adapted to be in physical contact with (i) the associated one of the vials, and (ii) the associated one of the surface mounted LEDs.

Preferably, each of the lenses has a lower surface provided with a substantially spherical indentation therein and a substantially cylindrical projection above the indentation, such that, in use, the associated one of the surface mounted LEDs is in contact with the indentation, and the associated one of the vials is in contact with the projection. The spherical indentation should be large enough to capture substantially all of the optical radiation from the associated one of the surface mounted LEDs. The lens should be comprised of a material having a refractive index substantially larger than 1, preferably, approximately 1.4, and a 2 mm thick sample of the lens material should be able to transmit at least 90% of light at the 365 nm UV wavelength. The lens also should be comprised of a material having a durometer of at least 65 on the Shore A scale. Additionally, the apparatus can further include a heat sink in thermal contact with the array of surface mounted LEDs, and one or more fans adapted to dissipate heat from the heat sink.

In accordance with a second aspect of the invention, apparatus for facilitating a chemical reaction through the application of light, comprises a light source providing illumination at a selected wavelength, a lens material adapted to be in physical contact with the light source, when in use, and a receptacle for holding a reaction vial in which the chemical reaction takes place, the receptacle adapted to position a portion of the reaction vial in physical contact with the lens material when in use, wherein the lens material has a refractive index that facilitates the transmission of the illumination from the light source to the reaction vial.

The light source can be a surface mounted LED having a base and a generally spherical dome from which the illumination emanates. The lens material can be configured on a first side with a generally spherical indentation, and the generally spherical dome of the LED should contact the lens material in the indentation when in use. The lens material is adapted to contact the reaction vial on a second side of the lens material generally opposite the first side. The generally spherical indentation should be large enough to cover enough of the base so that substantially all of the illumination from the LED enters the lens material. The refractive index of the lens material is preferably substantially greater that the refractive index of air, to thereby facilitate the transmission of the illumination from the LED to the reaction vial. The durometer of the lens material should be at least 65 Shore A, and preferably approximately 70-80 Shore A.

Alternatives to the embodiments described above can utilize a reaction plate, having an array of wells in which the chemical reactions take place, instead of a rack or receptacle for holding individual reaction vials.

The present invention finds particular utility for photoredox catalysis, but may be used for other photochemical reactions.

BRIEF DESCRIPTION OF THE DRAWINGS

These and other objects and aspects of the present invention will be described with reference to the following drawing figures, of which.

DETAILED DESCRIPTION OF THE INVENTION

Figure 1:
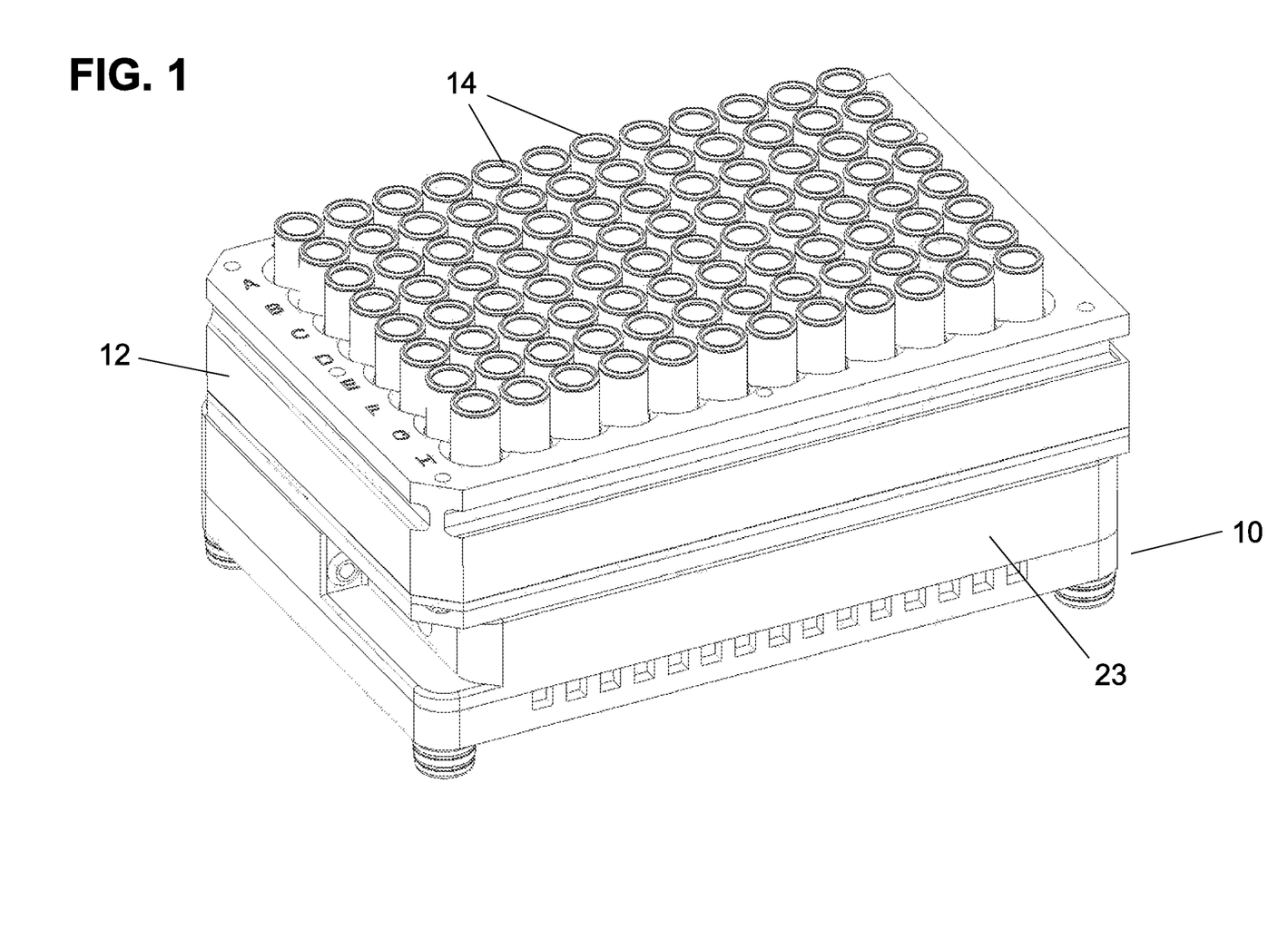
FIG. 1 is a perspective view of an example of an apparatus in accordance with the present invention.
Figure 2:
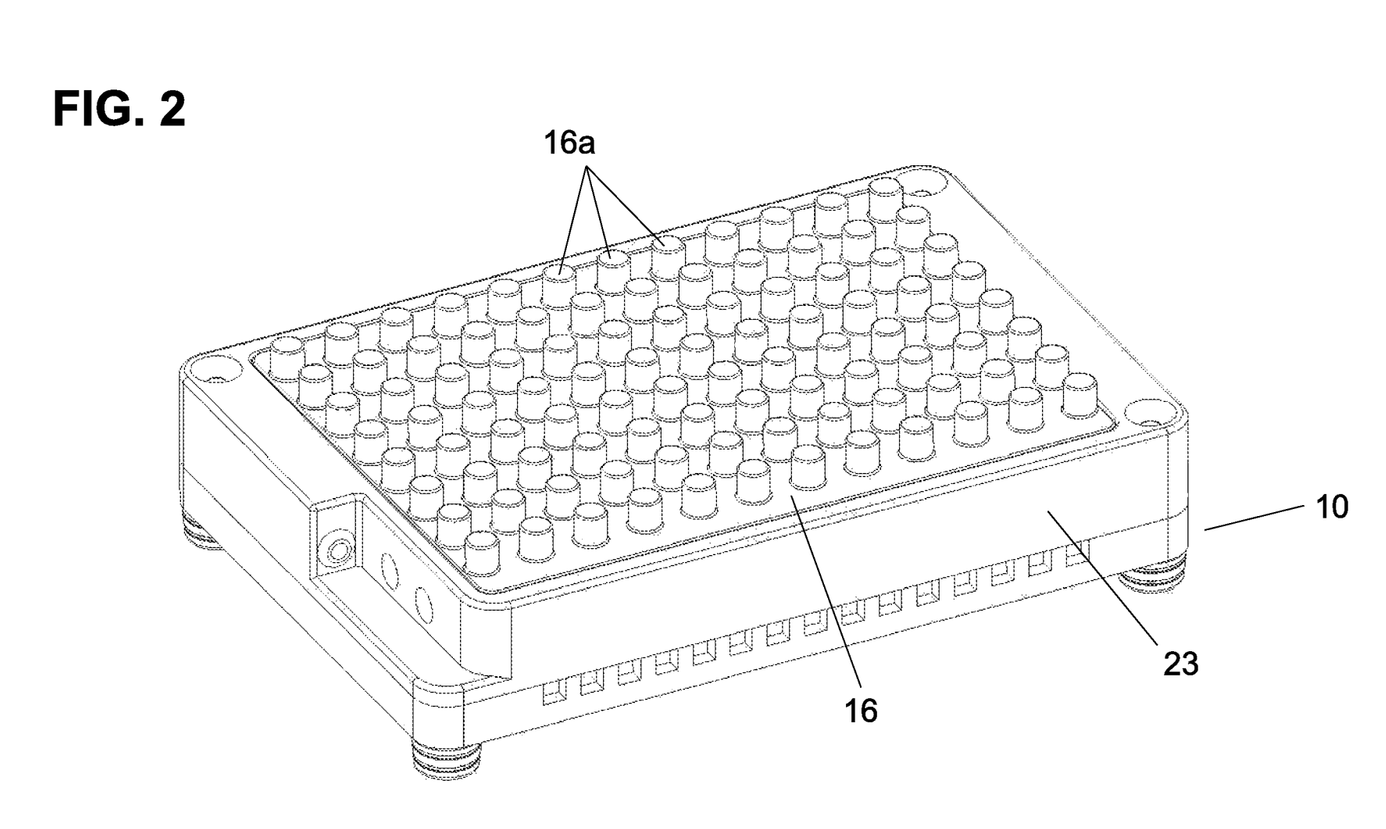
FIG. 2 is a perspective view of the apparatus of FIG. 1 with the vial rack removed.
Figure 3:
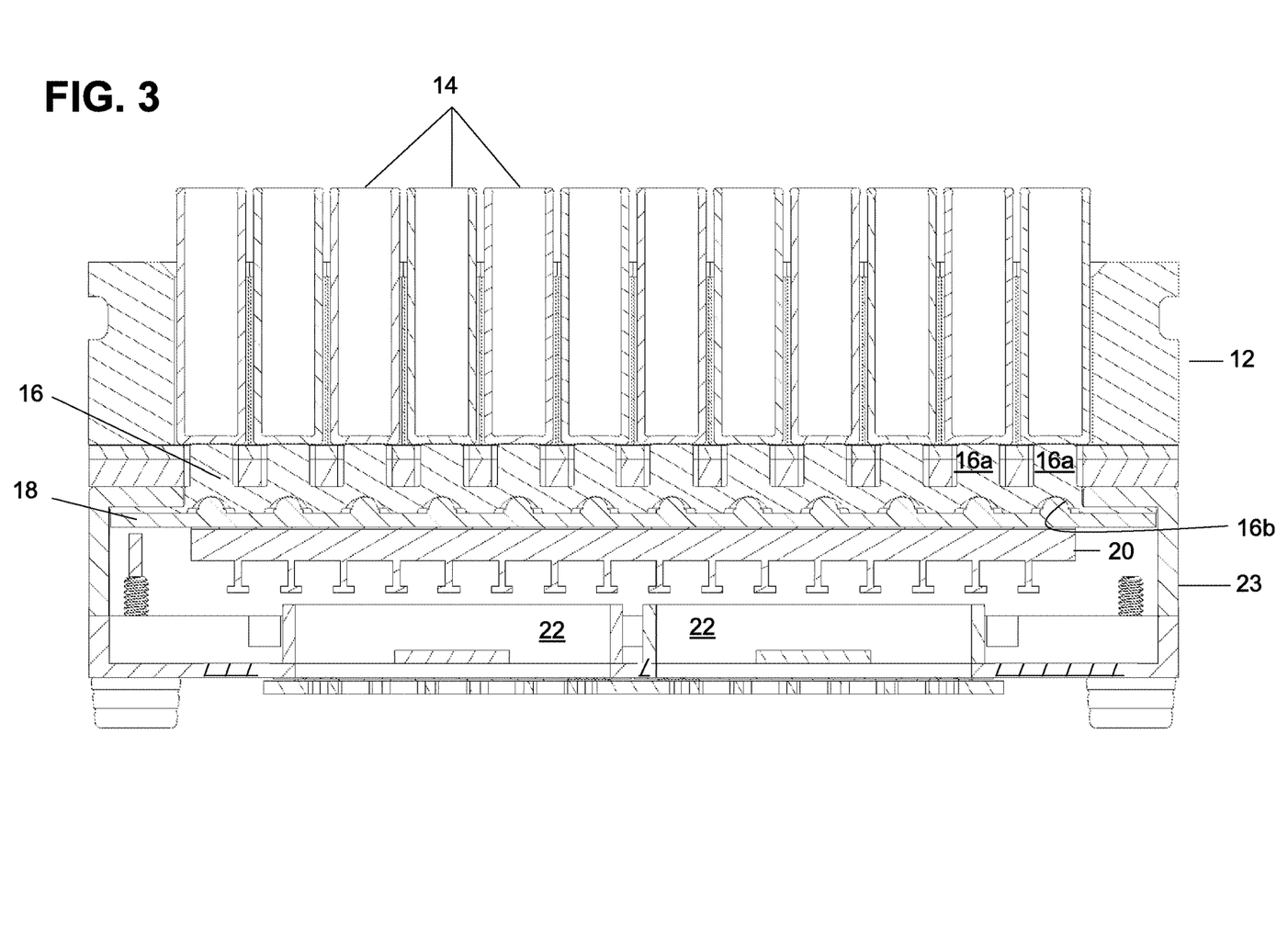
FIG. 3 is a cross-sectional view of the apparatus of FIG. 1.
Figures 4, 7:
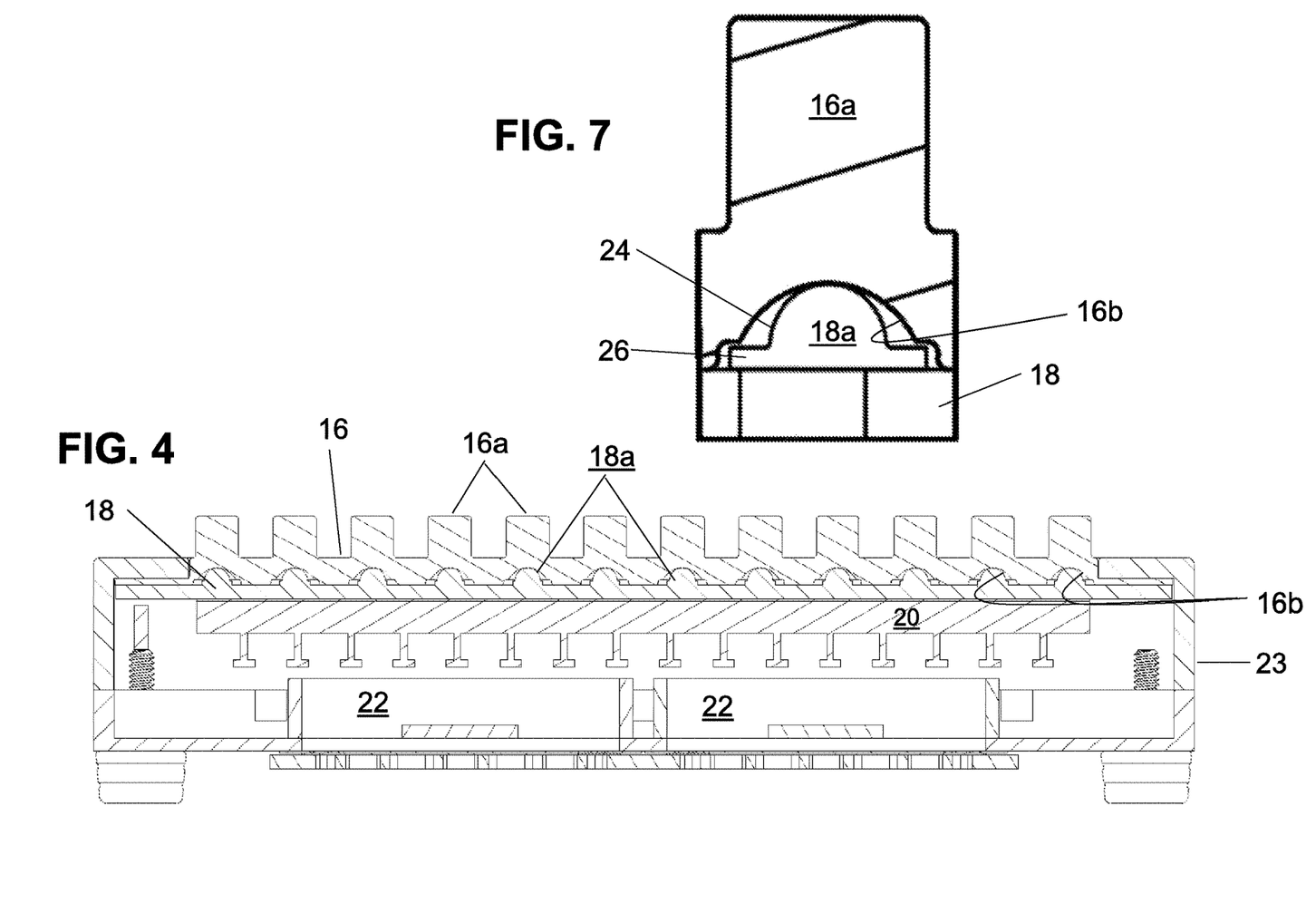
FIG. 4 is a cross-sectional view of the apparatus shown in FIG. 2, with the vial rack removed.
FIG. 7 is a detailed cross-sectional view of the LED and portion of a lens mat of FIG. 6.
Figure 5:
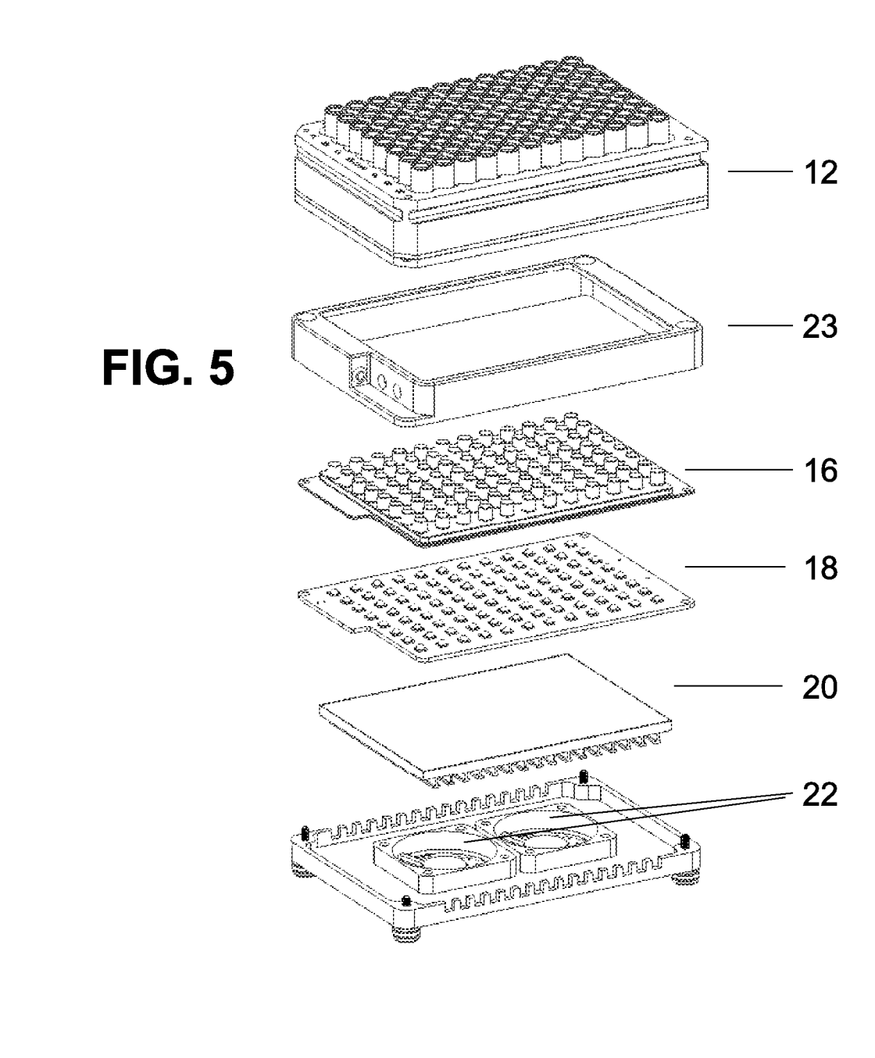
FIG. 5 is an exploded view of the component parts of the apparatus of FIG. 1.

An example of the apparatus for facilitating a photochemical reaction, photoredox catalysis for example, in accordance with a first embodiment of the present invention, is shown in FIGS. 1-7. As best shown in FIGS. 1, 3 and 5, the apparatus includes a base 10 and a vial rack 12 adapted to receive a plurality of glass vials 14. In the example shown, the apparatus can accommodate an array of 96 vials, although other numbers of vials and array sizes may be used, as will be appreciated. FIGS. 2 and 4 show the apparatus with the vial rack 12 removed, but the complete structure of the apparatus is best shown in FIGS. 3 and 5. The glass vials 14 are adapted to be inserted into receptacles in the vial rack 12, which is provided with openings on its bottom surface for each vial to thereby expose the bottom surfaces of the vials. The rack 12 in turn rests upon an array of lenses, or lens "mat" 16. As used herein, the term "lens" means the material that transmits optical radiation from a light source to the vials. As best shown in FIG. 4, the lens mat includes on its upper surface a plurality of cylindrical projections 16a having locations corresponding to the locations of the vials, such that each vial rests upon and contacts a corresponding one of the cylindrical projections 16a on the mat 16 when the vial rack is placed on the apparatus. The mat 16 also includes on its lower surface a plurality of spherical indentations 16b, best shown in FIGS. 6 and 7, having locations corresponding to the locations of each of the cylindrical projections 16a.

The mat 16 rests upon an LED circuit board 18 having a plurality of LEDs 18a in locations corresponding to the locations of each of the vials 14, such that each LED 18a is centrally disposed within, and in contact with, an associated spherical indentation 16b of the mat 16. The LED circuit board rests upon heat sink 20 within base 10. Also within the base, below the fins of the heat sink 20, one or more fans 22 may optionally be provided, to facilitate the removal of heat from the LED circuit board. Finally, a cover 23 may be used to house the lens mat 16, LED circuit board 18, heat sink 20 and fans 22.

In use, reaction mixtures are placed in vials 14, the vial rack is placed on the base 10, the LEDs are powered on, and a photochemical reaction, such as photoredox catalysis, takes place. As noted in the background, many prior art photochemical reactions, and in particular, photoredox catalysis reactions, may take many hours to complete. It is desirable to increase the intensity of the light applied to the reaction mixtures, to reduce the time required to complete the reactions. The present invention allows the use of high-power SMD (surface mount device or surface mounted diode) LEDs, without producing unproductive thermal pathways, to thereby dramatically reduce reaction times.

Figure 6:
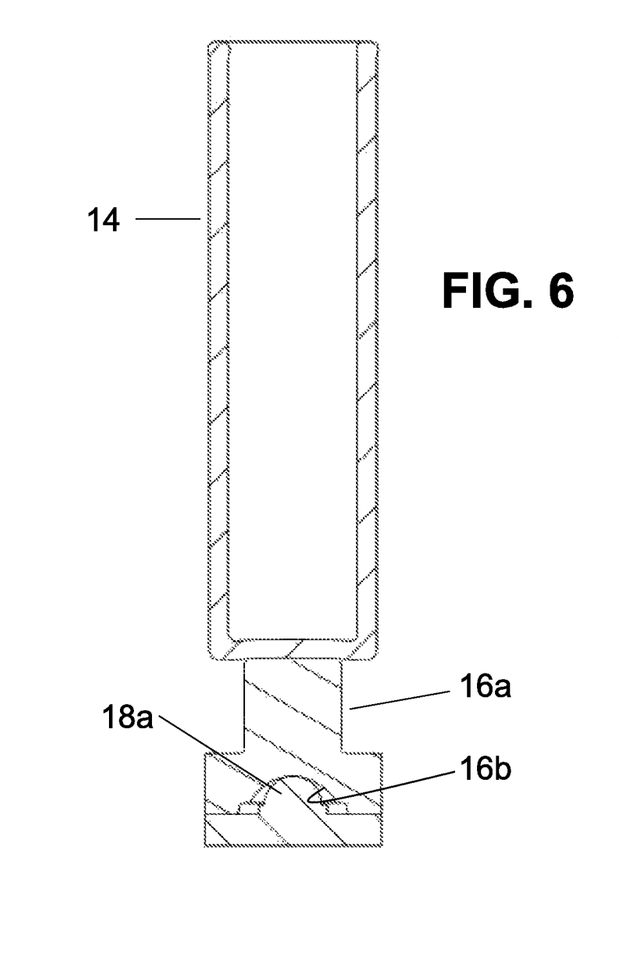
FIG. 6 is a detailed cross-sectional view of an LED, a portion of a lens mat and a vial, as used in the apparatus of FIG. 1.

Examples of specific implementations, and in particular, the optical properties of the materials and the geometries of the components used in the apparatus, to achieve this reduction in reaction times, in accordance with the present invention, will be described with reference to FIGS. 6 and 7. Specifically, the optical properties and geometries of the LEDs 18a, the lens mat 16, including the cylindrical projections 16a and the spherical indentations 16b, and the vials 14 should be selected as follows. (As used herein, the term "optical" is intended to include "radiometric" in the case of non-visible wavelengths such as UV or IR wavelengths, as well as visible wavelengths.) First, the LEDs should be selected to accommodate the specific reaction that the user wishes to achieve. Typically, for photoredox catalysis, the wavelengths will be selected within the range of about 365 to 750 nm. In the past, typical 5 mm domed through-hole LEDs have been used, but advances in surface mount technology have resulted in high-power SMD LEDs having higher efficiencies and optical intensities. For example, an individual SMD LED can be 8× more powerful than an individual through-hole LED. A drawback of the typical SMD LED, however, is that the beam angle tends to be much larger than a typical through-hole LED. Whereas a typical through-hole LED will focus the light in a tight 15-30° angle, an SMD LED has a beam angle around 115-150°, which can negatively affect the amount of optical power incident on the reaction mixture. The present invention alleviates this problem, as discussed below, capturing all or nearly all of that light emitted by the SMD LEDs and directing it into the reaction vials.

The optical properties and geometries of the lens mat 16, in combination with the LEDs and vials, are selected to maximize the input of the optical radiation from the LEDs to the lens mat 16, and from the lens mat 16 to the contents of the vials. SMD LEDs typically have a spherical dome 24 and square base 26, as best shown in FIG. 7. The size of the spherical indentations 16b is selected so that, in use, they contact the domes 24 of the LEDs and are large enough to substantially cover the square LED base 26, to thereby capture the maximum amount of light from the LEDs.

For photoredox catalysis, the lens mat 16, including the lenses, should be made from a material having the property that that a 2 mm thick sample of the material will transmit at least 90% of light at the 365 nm UV wavelength, although other properties may be suitable for specific reactions. It is noted that many moldable optical silicones transmit light well in the visible range, but not as well in the UV and IR wavelengths. This is an important consideration, since the present invention can be used with LEDs of wavelengths from UV to near-IR as well as white.

It is also important that the bottoms of the vials 14 maintain good contact with the tops of the cylindrical projections 16a of the lens mat 16, and that the surfaces of the spherical indentations 16b be in good contact with the LED domes 24. It has been found that a durometer of the lens mat material of at least 65 on the Shore A scale, and preferably in the 70-80 Shore A, allows this contact to occur using only the force of the weight of the vial rack itself against the silicone (for example, about 0.67 psi), although a lid or other device may be used to compress the glass vials if desired.

Figure 8:
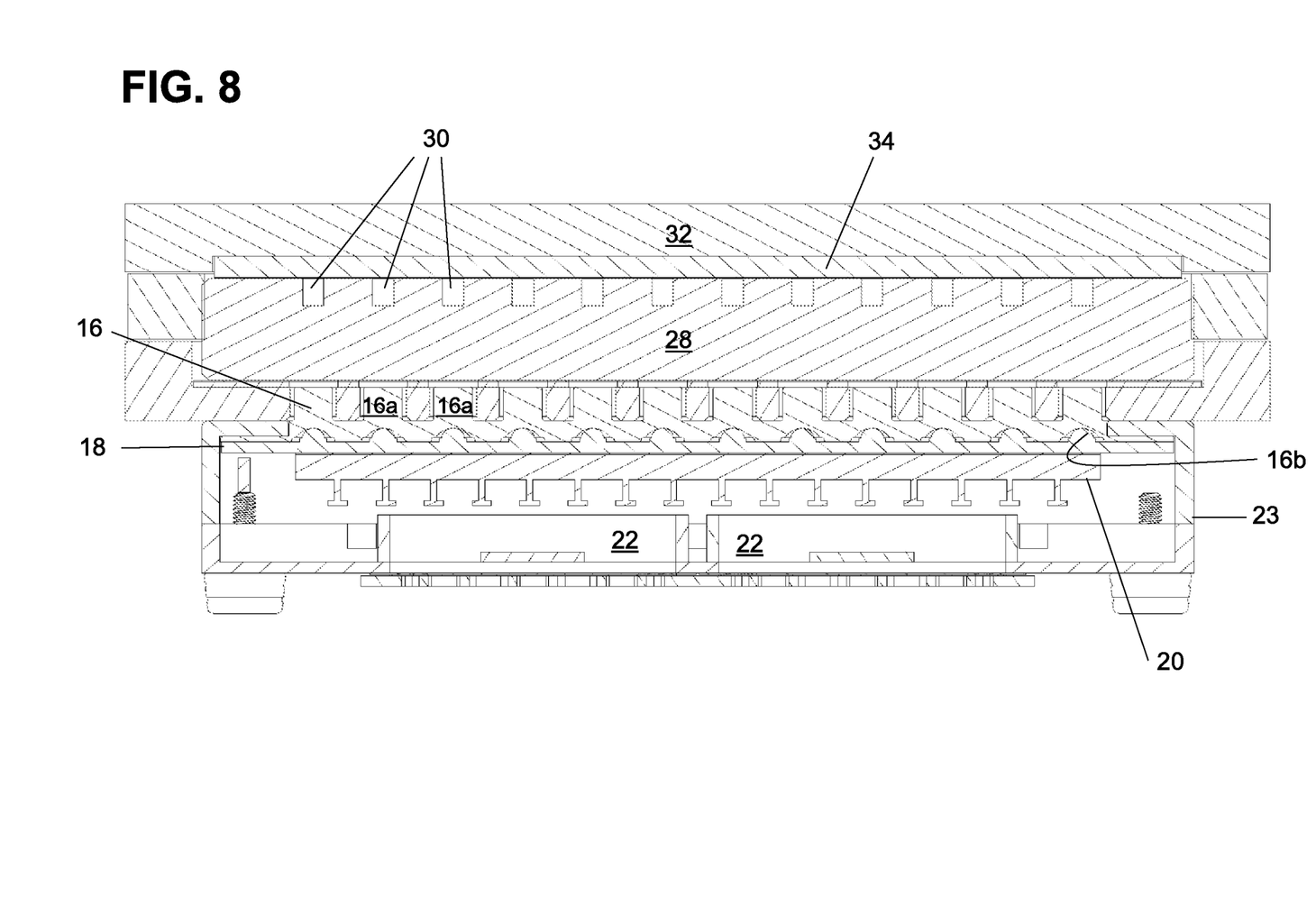
FIG. 8 is a cross-sectional view of an alternative embodiment of the invention.

FIG. 8 illustrates an example of an alternative embodiment. Instead of the vial rack 12 and individual vials 14 of FIGS. 1, 3, 5 and 6, a solid glass plate 28, having a plurality of reaction wells 30, is provided. Otherwise, the structures of the first and second embodiments are essentially the same, with the same reference numerals being used to denote the same or similar structures. The wells 30 are located directly above the cylindrical projections 16a on lens mat 16. A protective aluminum cover 32 is provided to cover the reaction wells, and a silicone cushioning sheet 34 may be provided between the cover 32 and the reaction vessels 30.

By selecting the materials and geometries as described above, the present invention will facilitate total internal reflection (TIR), the phenomenon that will allow the light to stay within the sides of the cylindrical projections 16a and be transmitted into the glass vials, in the case of the first embodiment of FIGS. 1-7, or the glass plate, in the case of the second embodiment of FIG. 8. The refractive indices of the lens mat and the glass vials or plate are selected to be about the same (for example, glass: 1.51; lens mat: 1.41), but the refractive index of air is considerably lower (i.e., 1), to thus allow the light to be coupled from the mat to the vial or plate. As the light rays travel from the LED through the lens mat, they bounce against the sides of the cylindrical projections 16a (i.e., internally reflect), as opposed to escaping through the sides of the projections, due to the lower refractive index of air, and continue up until they reach the glass vials 14 or plate 28, into which they are able to pass smoothly because of the similar refractive indices. Thus, it is important to minimize any air gaps between the tops of the cylindrical projections 16a and the bottoms of the vials 14 or plate 28.

The present invention, as described above, has been shown to provide a dramatic improvement—an order of magnitude improvement—in reaction times over prior art. In particular, it has been found that a particular photocatalysis reaction using the present invention achieves a 15% assay yield after running for 30 minutes, versus a 0.75-1% assay yield using a prior art Lumidox device—a 15 to 20-fold increase in yield over the same amount of time. The present invention thus provides a tremendous advantage over prior art techniques. Moreover, the compact design of the invention as described above allows it to comply with the microplate footprint dimensions set forth in ANSI standard SLAS 1-2004 (R2012), the entire disclosure of which is hereby incorporated by reference.

It should be noted that, although the above embodiments have been described as having the LEDs located below the reaction vessels or wells, the apparatus in accordance with the present invention may be constructed such that the LEDs are located above the reaction vessels or wells, in which case the structures shown in the figures will be rotated 180°, provided that a suitable structure, such as the plates 32/34, are employed to maintain the reaction mixtures in the vials or wells.

It will be understood that various additional changes in the details, materials and arrangements of parts which have been herein described and illustrated in order to explain the nature of the invention may be made by those skilled in the art within the principle and scope of the invention as expressed in the following claims.

We claim:

1. Apparatus for facilitating a chemical reaction through the application of light, comprising:
    a. a light source providing illumination at a selected wavelength;
    b. a lens material adapted to be in physical contact with said light source, when in use; and
    c. a receptacle for holding a reaction vial in which said chemical reaction takes place, said receptacle adapted to position a portion of said reaction vial in physical contact with said lens material when in use;
    d. wherein said lens material has a refractive index that facilitates the transmission of said illumination from said light source to said reaction vial.

2. The apparatus of claim 1, wherein said light source is a surface mounted LED having a base and a generally spherical dome from which the illumination emanates.

3. The apparatus of claim 2, wherein said lens material is configured on a first side with a generally spherical indentation, said generally spherical dome of said LED contacts said lens material in said indentation when in use, and said lens material is adapted to contact said reaction vial on a second side of said lens material generally opposite said first side.

4. The apparatus of claim 3 wherein said generally spherical indentation is large enough to cover enough of said base so that substantially all of said illumination from said LED enters said lens material.

5. The apparatus of claim 3 wherein the refractive index of said lens material is substantially greater than the refractive index of air, to thereby facilitate the transmission of said illumination from said LED to said reaction vial.

6. The apparatus of claim 5 wherein the durometer of said lens material is at least approximately 65 Shore A.

7. The apparatus of claim 6 wherein the durometer of said lens material is 70-80 Shore A.

8. The apparatus of claim 2 wherein said chemical reaction is photoredox catalysis.

9. Apparatus for facilitating a chemical reaction through the application of light, comprising:
    a. a light source providing illumination at a selected wavelength;
    b. a lens material adapted to be in physical contact with said light source, when in use; and
    c. a reaction plate for holding a reaction well in which said chemical reaction takes place, said reaction plate adapted to be in physical contact with said lens material when in use;
    d. wherein said lens material has a refractive index that facilitates the transmission of said illumination from said light source to said reaction plate.

10. The apparatus of claim 9, wherein said light source is a surface mounted LED having a base and a generally spherical dome from which the illumination emanates.

11. The apparatus of claim 10, wherein said lens material is configured on a first side with a generally spherical indentation, said generally spherical dome of said LED contacts said lens material in said indentation when in use, and said lens material is adapted to contact said reaction plate on a second side of said lens material generally opposite said first side.

12. The apparatus of claim 11 wherein said generally spherical indentation is large enough to cover enough of said base so that substantially all of said illumination from said LED enters said lens material.

13. The apparatus of claim 11 wherein the refractive index of said lens material is substantially greater than the refractive index of air, to thereby facilitate the transmission of said illumination from said LED to said reaction plate.

14. The apparatus of claim 13 wherein the durometer of said lens material is at least approximately 65 Shore A.

15. The apparatus of claim 14 wherein the durometer of said lens material is 70-80 Shore A.

16. The apparatus of claim 10 wherein said chemical reaction is photoredox catalysis.

17. Apparatus for facilitating chemical reactions through the application of light, comprising:
 a. a rack adapted to hold an array of vials in which said chemical reactions are to take place, said rack having openings on a first side thereof at locations corresponding to the locations of said array of vials, to thereby expose a portion of said vials when in use;
 b. an array of surface mounted LEDs having locations corresponding to the locations of said array of vials; and
 c. an array of lenses adapted to be disposed between said array of vials and said array of surface mounted LEDs, such that each of said lenses is adapted to be positioned between an associated one of said vials and an associated one of said surface mounted LEDs;
 d. wherein said rack, said array of surface mounted LEDs and said array of lenses are configured such that, when in use, each of said lenses is adapted to be in physical contact with (i) said associated one of said vials, and (ii) said associated one of said surface mounted LEDs.

18. The apparatus of claim 17, wherein each of said lenses has a surface provided with a substantially spherical indentation therein and a substantially cylindrical projection opposite said indentation, such that, in use, said associated one of said surface mounted LEDs is in contact with said indentation, and said associated one of said vials in in contact with said projection.

19. The apparatus of claim 18 wherein said substantially spherical indentation is large enough to capture substantially all of the optical radiation from said associated one of said surface mounted LEDs.

20. The apparatus of claim 18 wherein said lens is comprised of a material having a refractive index substantially larger than 1.

21. The apparatus of claim 20 wherein said lens is comprised of a material having a refractive index of approximately 1.4.

22. The apparatus of claim 21 wherein said lens is comprised of a material having a durometer of at least approximately 65 on the Shore A scale.

23. The apparatus of claim 18 further comprising a heat sink in thermal contact with said array of surface mounted LEDs.

24. The apparatus of claim 17 wherein said apparatus has a footprint that complies with ANSI standard SLAS 1-2004 (R2012).

25. Apparatus for facilitating chemical reactions through the application of light, comprising:
 a. A reaction plate having an array of reaction wells in which said chemical reactions are to take place;
 b. an array of surface mounted LEDs having locations corresponding to the locations of said array of reaction wells; and
 c. an array of lenses adapted to be disposed between said array of reaction wells and said array of surface mounted LEDs, such that each of said lenses is adapted to be positioned between an associated one of said reaction wells and an associated one of said surface mounted LEDs;
 d. wherein said reaction plate, said array of surface mounted LEDs and said array of lenses are configured such that, when in use, each of said lenses is adapted to be in physical contact with (i) said reaction plate, and (ii) said associated one of said surface mounted LEDs.

26. The apparatus of claim 25, wherein each of said lenses has a surface provided with a substantially spherical indentation therein and a substantially cylindrical projection opposite said indentation, such that, in use, said associated one of said surface mounted LEDs is in contact with said indentation, and said reaction plate is in contact with said projection.

27. The apparatus of claim 26 wherein said substantially spherical indentation is large enough to capture substantially all of the optical radiation from said associated one of said surface mounted LEDs.

28. The apparatus of claim 26 wherein said lens is comprised of a material having a refractive index substantially larger than 1.

29. The apparatus of claim 28 wherein said lens is comprised of a material having a refractive index of approximately 1.4.

30. The apparatus of claim 29 wherein said lens is comprised of a material having a durometer of at least approximately 65 on the Shore A scale.

31. The apparatus of claim 26 further comprising a heat sink in thermal contact with said array of surface mounted LEDs.

32. The apparatus of claim 25 wherein said apparatus has a footprint that complies with ANSI standard SLAS 1-2004 (R2012).

33. Apparatus for facilitating a chemical reaction through the application of light, comprising:
 a. at least one light source providing illumination at a selected wavelength;
 b. a lens material adapted to be in physical contact with said light source, when in use; and
 c. a container in which said chemical reaction takes place, said container adapted to be in physical contact with said lens material when in use;
 d. wherein said lens material has a refractive index that facilitates the transmission of said illumination from said light source to said container.

34. The apparatus of claim 33 wherein said container comprises a reaction vial in which said chemical reaction takes place, and a receptacle for holding said reaction vial, said receptacle adapted to position a portion of said reaction vial in physical contact with said lens material when in use.

35. The apparatus of claim 33 wherein said container comprises a reaction plate for holding a reaction well in which said chemical reaction takes place, said reaction plate adapted to be in physical contact with said lens material when in use.

36. The apparatus of claim 33 wherein said container comprises a rack adapted to hold an array of vials in which chemical reactions are to take place, said rack having openings on a first side thereof at locations corresponding to the locations of said array of vials, to thereby expose a portion of said vials when in use.

37. The apparatus of claim 33 wherein said container comprises a reaction plate for holding an array of reaction wells in which chemical reactions take place, said reaction plate adapted to be in physical contact with said lens material when in use.

38. The apparatus of claim 33, wherein said light source is a surface mounted LED having a base and a generally spherical dome from which the illumination emanates.

39. The apparatus of claim 38, wherein said lens material is configured on a first side with a generally spherical indentation, said generally spherical dome of said LED contacts said lens material in said indentation when in use, and said lens material is adapted to contact said container on a second side of said lens material generally opposite said first side.

40. The apparatus of claim 39 wherein said generally spherical indentation is large enough to cover enough of said base so that substantially all of said illumination from said LED enters said lens material.

41. The apparatus of claim 39 wherein the refractive index of said lens material is substantially greater than the refractive index of air, to thereby facilitate the transmission of said illumination from said LED to said container.

42. The apparatus of claim 41 wherein the durometer of said lens material is at least approximately 65 Shore A.

43. The apparatus of claim 42 wherein the durometer of said lens material is 70-80 Shore A.

* * * * *